United States Patent

[11] 3,632,256

[72] Inventors Howard Edward Kasting;
 Roger Brown Staub, both of Somerville, N.J.
[21] Appl. No. 808,394
[22] Filed Mar. 19, 1969
[45] Patented Jan. 4, 1972
[73] Assignee Union Carbide Corporation
 New York, N.Y.

[54] EXTRUSION-COMPOUNDING APPARATUS
 1 Claim, 5 Drawing Figs.
[52] U.S. Cl. ........................................... 425/205,
 425/208
[51] Int. Cl. ............................................. B29f 3/02
[50] Field of Search .................................. 18/12 SF,
 12 SS, 12 SP, 12 SN, 12 SV, 12 SH, 12 SA, 12 SM,
 30 SR, 30 SS, 30 SA, 30 SM, 30 QP, 30 PM, 12 SP

[56] References Cited
 UNITED STATES PATENTS
| | | | |
|---|---|---|---|
| 2,488,189 | 11/1949 | Hanson | 18/12 SH UX |
| 2,686,335 | 8/1954 | Gross | 18/12 SH |
| 2,836,851 | 6/1958 | Holt | 18/12 SS |
| 3,256,562 | 6/1966 | Heard | 18/12 SN |
| 3,278,986 | 10/1966 | Welt | 18/12 SH UX |
| 3,407,439 | 10/1968 | Gregory | 18/12 SH |

FOREIGN PATENTS
| | | | |
|---|---|---|---|
| 1,014,735 | 8/1957 | Germany | 18/12 SP |
| 816,279 | 7/1959 | Great Britain | 18/30 SR |

*Primary Examiner*—J. Spencer Overholser
*Assistant Examiner*—Michael O. Sutton
*Attorneys*—Paul A. Rose, Gerald R. O'Brien, Jr. and Aldo J. Cozzi

ABSTRACT: The disclosure relates to apparatus for the extrusion compounding of plastic material employing extruder screw means mounted in extruder housing means having a plurality of plastic material feed port means and compounded plastic material discharge port means arranged to define a plurality of separate compounding zones in tandem along the length of said extruder housing means.

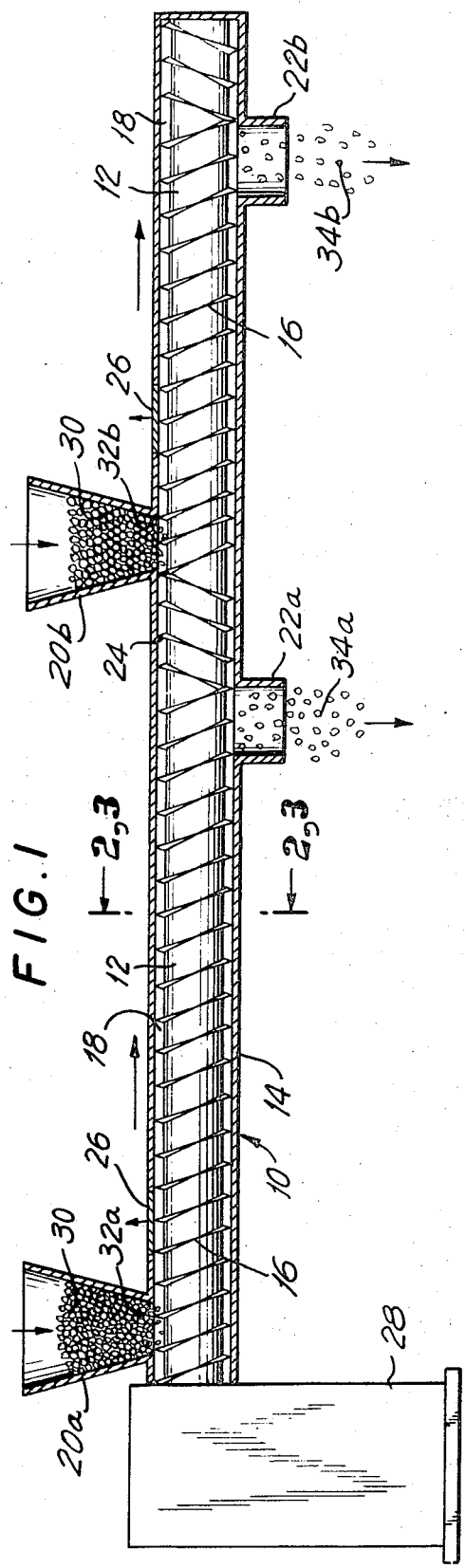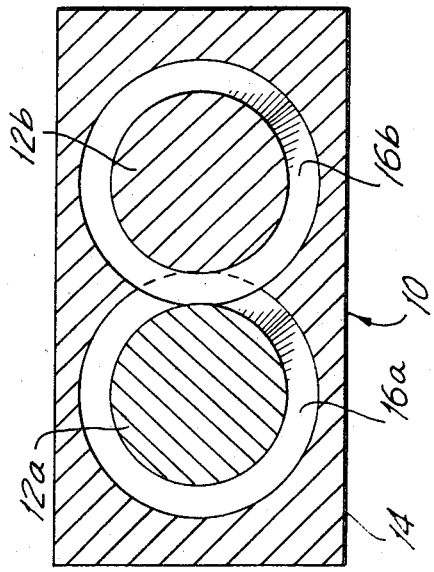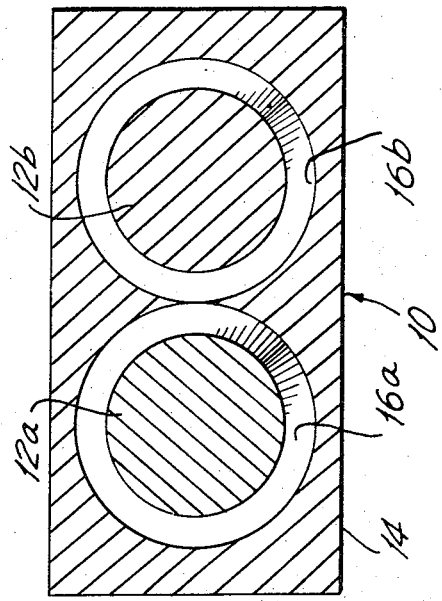

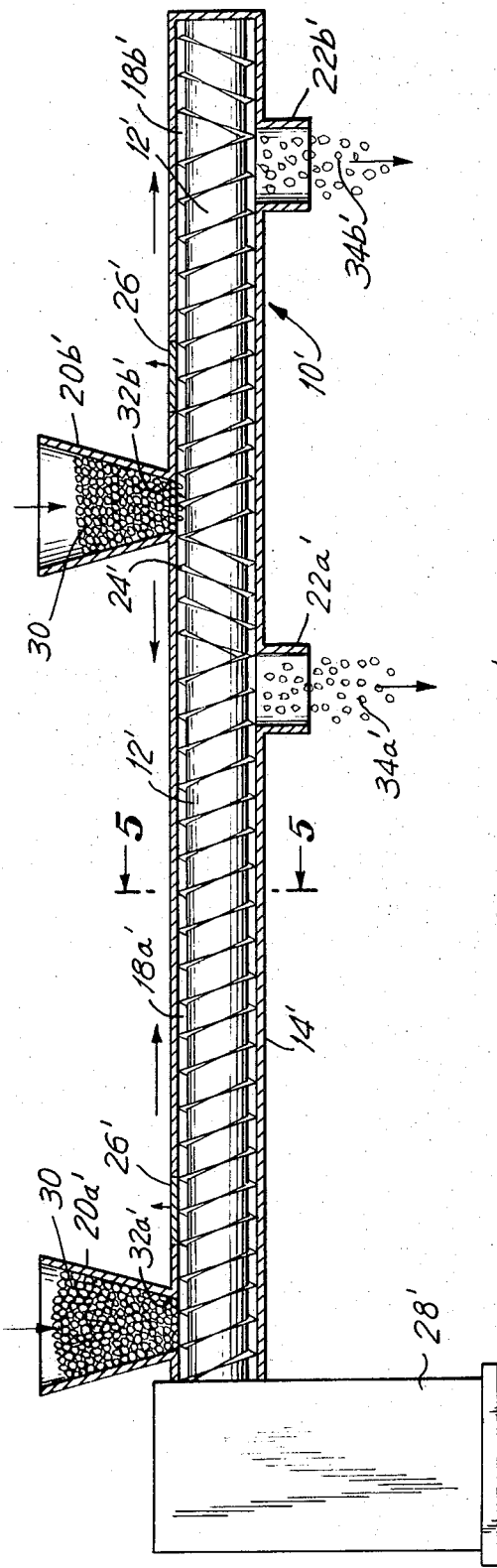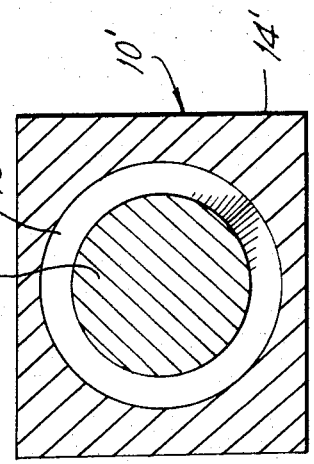

3,632,256

EXTRUSION-COMPOUNDING APPARATUS

FIELD OF THE INVENTION

The present invention relates to the extrusion compounding of plastic material. More particularly, the present invention relates to apparatus for the extrusion compounding of a plurality of streams of plastic material.

THE PRIOR ART

In normal plastic material extrusion compounding operations, where only short residence times are required for processing the material, a relatively short extruder is usually employed, i.e., one having about a 15:1 ratio of barrel length to screw diameter. Generally, in such operations, only about one-half of the available screw torque of the drive means is utilized for compounding.

It has long been desired to improve the efficiency of operation by utilizing more of the available torque for compounding, without sacrificing product quality or uniformity. For this reason, one trend with respect to both single-screw and twin-screw plastic extruder compounders has been in the direction of increasing the barrel length to screw diameter ratio in order to obtain greater torque efficiency.

Another attempt to increase torque efficiency has been made in the direction of commonly driving single or twin-screw plastic extruder compounders from the same drive means in order to more fully utilize available torque. Some of such single and twin-screw systems are disclosed in the text "Plastic Extrusion—Technology and Theory" by Dr. G. Schenkel, American Elsevier Publishing Co., New York, New York (first published in Germany, 1963, Verlag Carl Hanser). The single-screw embodiment disclosed on page 42 of this text employed a central drive shaft means between single-screw extruder compounders, plastic material being fed outwardly and separately from the drive means through each of the extruder compounders. The twin-screw embodiment disclosed on page 41 employs twin-screws, each driven at an opposite end, with the plastic material inlet streams fed at opposite ends, with each half of the extruder compounder having opposite screw pitches, and with a common outlet at the center of the extruder housing.

Other arrangements of both single and twin-screw extruder compounders have been suggested for increasing torque efficiency, but, in each instance, other serious limitations have resulted, thereby preventing full utilization of the improvement. For example, the mere increase in barrel length to screw diameter greatly reduces the rate of throughput of the extruder compounder, thereby reducing the throughput capacity of the entire processing operation employing the extruder compounder.

On the other hand, the processing of plastic material in separate streams having opposed longitudinal directions of feed, as suggested in the Schenkel text, presents inherent thrust problems, the solutions of which are so complex as to outweigh the benefits in torque efficiency obtained. For example, a failure in inlet feed of plastic material to one of the extrusion compounding zones (or extruder) of either the single-screw or the twin-screw embodiments of the Schenkel text would result in the consequent development of a thrust on either the common drive means and opposite bearing of the empty extrusion zone of the single-screw embodiment, or, in the case of the twin-screw extruder, on the opposite bearing and entire length of both screws of the extruder.

Quite generally, in the case of extruder compounders having processing zones, wherein material is processed in opposite longitudinal directions, the thrust problem developed upon the failure of plastic feed material to any of the zones is inherent and would require the provision of counterthrust compensating bearings, all of which are quite complex in design and consequently expensive in employment.

Other objects and advantages of the invention will be apparent from the following description and appended claims.

It is, accordingly, the prime object of the present invention to provide plastic extrusion compounding apparatus having improved torque efficiency, while maintaining high throughout rates and without developing other problems causing limitations on the system.

SUMMARY

In accordance with the present invention, a process is provided for the extrusion compounding of plastic material comprising separately introducing a plurality of streams of plastic material to separate tandem zones of an extrusion compounder, processing said separate streams in said separate tandem zones and separately removing the processed plastic material from said separate tandem zones without intermingling of said plastic material during such processing.

As employed herein, the term "separate tandem zones" means separate zones along the length of the extruder compounder in which plastic material to be processed passes in the same direction in each zone from a separate inlet to a separate outlet. The plurality of streams of plastic material passed to separate tandem zones in the extrusion compounding process of the present invention may be of any number from a twin arrangement higher. The discharge end of each of the processing zones must be adequately separated from the inlet end of the next succeeding tandem processing zone.

As employed herein, the term "plastic material" envisions the extrusion compounding processing of solid or liquid plastic materials or mixtures thereof, either separate or in further admixture with solid reinforcing materials well known to the art, such a fiberglass, metal fibers and the like. Examples of such plastic materials include the following resins: phenolic, polyvinyl chloride, polyethylene, polypropylene, polysulfone, polystyrene and epoxy resins which may be either solid or liquid. Additionally, the term "plastic material" encompasses both thermoplastic and thermosetting materials. Of the above-recited examples of plastic resin materials, all are thermoplastic with the exception of phenolic and epoxy resins.

In accordance with the present invention, an extrusion compounder is provided employing extruder screw means mounted in extruder housing means having a plurality of plastic material feed port means and compounded plastic material discharge port means arranged to define a plurality of separate compounding zones in tandem along the length of said extruder housing means, said extruder screw means having, between each of said compounding zones, a reverse pitch screw threaded section contiguous with each of the forward compounding zone forward pitch screw thread sections of said compounding zones.

As employed herein, the term "extruder screw means" is meant to include both single extruder screws and twin extruder screws, both well known in the art. Such extruder screws may be formed of a plurality of commonly shafted sections, as are provided by some manufacturers, or may be formed of a unitary single screw, as provided by other manufacturers. In any event, the extruder screw means may be comprised of a wide variety of combinations having variations of screw pitch and direction. Kneading block sections, well known in the art, may be employed, as desired, in portions of the extruder screw means.

In the case of twin extruder screw means, the twin screws may be mounted in the extruder housing means either in close proximity to each other so as to provide a clearance between each other, or, alternatively, may be very closely positioned so that the threads of each screw are intermeshing and project within the threads of the other.

The twin-screw extruder embodiment of the present invention may be driven so that the screws are either corotating or counterrotating. It is to be understood that, for many operations, in the preferred embodiment of the apparatus of the present invention, the twin-screws are to be corotating and intermeshing so as to provide a desired self-wiping action which aids in preventing the build up of plastic material being processed in the roots of the threads of the extruder screws.

It is understood that, in the twin-screw embodiment of the apparatus aspect of the invention, the twin-screws may be driven either commonly from the same end by a single drive means or separately from opposite ends by separate drive means.

In compounding heat sensitive resins, such as with thermosetting phenolic molding materials, more heat is generated in compounding than is removed as sensible heat with the product. Consequently, cooling of the product by means of heat conduction through refrigerated media cooling of screws and barrels, is required. Therefore, capacity for cooling the product becomes the limiting factor affecting rate capability in scaling up to larger size production extruder units. The plural feed and processing configuration of the present invention greatly increases the cooling capacity per pound of throughput material which is important in preventing overheating of the material in the larger size machines. The present invention, therefore, permits scale-up to higher production rates than those attainable with a single barrel configuration for any given extruder size.

In addition, it has been found that, in employing the present invention, the processing rate is optimized at a lower rate through each of the separate streams, thereby permitting the attainment of maximum product quality and uniformity.

Reference is made to the figures of the drawings in which:

FIG. 1 is a schematic vertical cross-sectional view of twin-screw apparatus for the extrusion compounding of plastic material embodying the invention and employing two separate tandem compounding zones;

FIG. 2 is a sectional view of the apparatus of FIG. 1. taken along the line 2—2 of FIG. 1;

FIG. 3 is a sectional view of the apparatus of FIG. 1 taken along the line 3—3 of FIG. 1;

FIG. 4 is a schematic vertical cross-sectional view of single-screw apparatus for the extrusion compounding of plastic material embodying the invention and employing two separate tandem compounding zones; and FIG. 5 is a cross-sectional view taken along the line 5—5 of FIG. 4.

DESCRIPTION

Referring specifically to FIGS. 1-3 of the drawings, an extrusion compounder 10 is provided employing extruder screw means 12 mounted in close clearance with an external extruder housing 14, extruder screw means 12, in turn, comprising twin extruder screws 12a and 12b. As shown in FIG. 2, the twin extruder screws 12a and 12b are mounted in close proximity along their outer peripheries but not mounted so closely as to have the extruder screw threads 16a and 16b intermeshing. As shown in FIG. 3 of the drawings, the twin extruder screws 12a and 12b are closely mounted so as to have their screw threads 16a and 16b intermeshing.

The extruder screw means 12 are divided into two separate processing zones 18a and 18b, each fed by a separate inlet hopper means 20a and 20b, respectively, and each serviced by a plastic material discharge port means 22a and 22b.

A section of reverse pitch screw thread 24 is provided between the outlet end of separate processing zone 18a and the inlet end of separate processing zone 18b so as to provide against the intermingling of plastic material between the separate compounding processing zones.

Each of the processing zones is provided, near the inlet end, with vent port means 26 for passing off any entrapped air to a vent, on which a vacuum may be drawn, if desired. The vent port means 26 may comprise an outlet in which a porous screen is mounted with a backing of glass wool or a similar material.

As shown in the embodiment of FIGS. 1-3, the extruder screw means 12 are commonly driven by drive means 28 coupled to the extruder screw means so as to commonly drive the twin extruder 12a and 12b in the desired corotating or counterrotating manner.

In operation, plastic material 30 is fed to hoppers 20a and 20b and through the inlet feed ports 32a and 32b, respectively, of each of the two separate tandem processing zones 18a and 18b of the extruder compounder 10. Upon compounding in each of the two separate tandem processing zones, the material streams 43a and 34b are discharged, respectively, through separate compounded plastic material discharge ports 22a and 22b, after which they may be further processed.

In the single-screw embodiment of FIGS. 4 and 5, identical primed reference numerals have been assigned to the elements performing identical functions to those bearing the same reference numeral in the embodiment of FIGS. 1-3. The difference between the modified apparatus as shown in FIGS. 4 and 5 and that of the embodiment of FIGS. 1-3 is that a single-screw extruder means is employed, rather than a twin-screw extruder means.

In an example of the present invention, a dual feed extrusion compounder of the type shown in FIGS. 1 and 3 of the drawings was employed to process phenolic molding material. The extruders employed twin-screws, each of 53 mm. diameter and driven from the same end in a corotating manner at 300 r.p.m.

The overall length of the installed screws was 2,344 mm., providing two processing zones, each of 840 mm. length. Of this length, 85 mm. length comprised kneading blocks and the remainder consisted of triple flighted intermeshing threads having a 90 mm. pitch (length for complete turn).

Water cooling was employed in the housing of the extruder, the water being circulated at a flow rate of 6.5 gallons per minute and being maintained at 60°C. with 40 p.s.i. pressure.

One hundred thirty-five pounds of phenolic molding material were passed through each of the dual sections, for a total of 270 pounds for the run.

After processing in the extruder compounder, the material was granulated with a rotary knife cutter and was classified. It was post-blended in a mixture with the following results:

| Blending Time | Apparent Density |
|---|---|
| 15 min. | 0.59 g./cc. |
| 30 min. | 0.61 g./cc. |
| 45 min. | 0.62 g./cc. |

We claim:

1. Apparatus for the extrusion compounding of plastic material comprising extruder screw means mounted in extruder housing means having a plurality of plastic material feed port means and compounded plastic material discharge port means arranged to define a plurality of separated compounding zones in tandem along the length of said extruder housing means, said extruder screw means having, between each of said compounding zones, a reverse pitch screw thread section contiguous with each of the forward compounding zone forward pitch screw thread sections of said compounding zones, said extruder screw means comprising twin, corotating, intermeshing extruder screws.

* * * * *